Nov. 2, 1926.
G. J. RACKHAM
MOTOR VEHICLE
Filed April 21, 1924
1,605,065
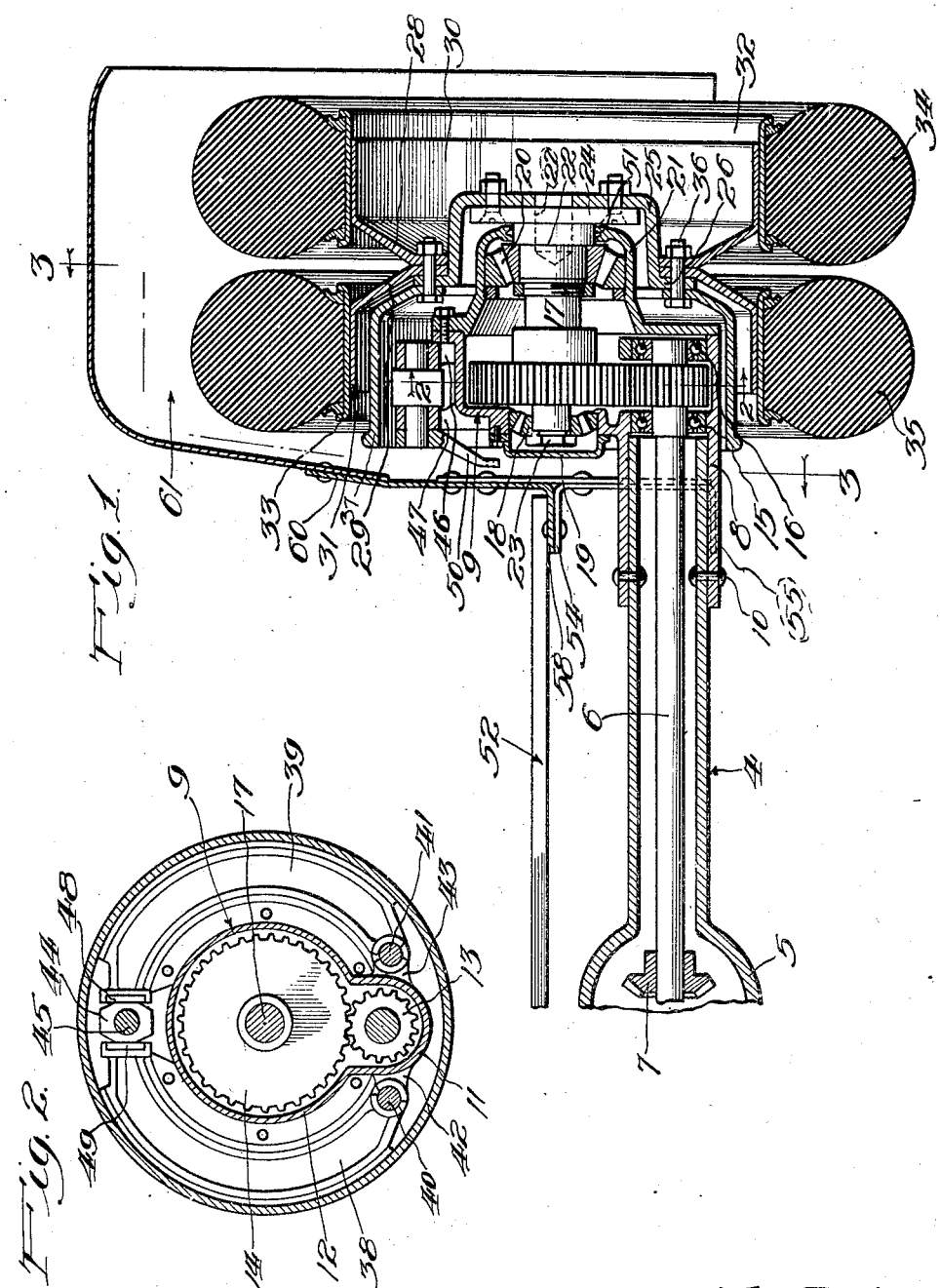
Inventor:
George J. Rackham,
by
Attys.

Patented Nov. 2, 1926.

1,605,065

UNITED STATES PATENT OFFICE.

GEORGE JOHN RACKHAM, OF CHICAGO, ILLINOIS, ASSIGNOR TO YELLOW COACH MANUFACTURING COMPANY, OF CHICAGO, ILLINOIS, A CORPORATION OF ILLINOIS.

MOTOR VEHICLE.

Application filed April 21, 1924. Serial No. 707,812.

The present invention has reference to improvements in motor vehicles. It has reference particularly to improvements in the driving gear for motor vehicles, such as motor coaches, trucks, tractors, etc.

One of the objects of the invention is to provide an improved rear axle construction for establishing the driving connection from the differential to the wheel. In this connection, one object is to provide a construction such that the position of the axle itself may be dropped down to a relatively low elevation. This will make it possible to place the floor level of the coach or other vehicle low down, with the attendant advantages of construction, etc.

Another feature of the invention relates to the provision of a spur gear drive between the outer end of the axle shaft and the wheel hub. A further object is to provide a construction such that the spur gears and related parts may all be completely housed in a closed oil tight casing, so that they can run continuously within an oil bath.

A further object of the invention is to provide a construction such that the wheel hub or hub shaft can be supported by bearings at two points considerably separated from each other so as to give a very rigid support and relieve the twisting strain on the bearings. Another object in this connection is to so arrange the parts that one of these bearings will come substantially in line with the center of the wheel and thus serve as a direct support for the major portion of the weight on the axle.

A further object of the invention is to provide a construction in which both of the spur gears may be supported by suitable ball or roller bearings at both sides thereof so as to give a very rigid and satisfactory support.

Another feature of the invention relates to the provision of an improved mounting for the brake shoes for the driving wheel to which the power is applied. In this connection, it is an object to so arrange the casing for the spur gears that the brake shoes may encircle the same and find bearings at the lower side portions thereof. This will provide a very compact and substantial construction and one well adapted to receive and transmit the various forces.

Other objects and uses of the invention will appear from a detailed description of the same, which consists in the features of construction and combinations of parts hereinafter described and claimed.

In the drawings:

Figure 1 shows a longitudinal section through one of the driving wheels together with the axle housing and gear mechanism therefor; and Fig. 2 shows a cross section taken on the line 2—2 of Fig. 1, looking in the direction of the arrows.

The construction illustrated in the drawings makes use of a double tread or double tire wheel. This construction is illustrated as being a type which is capable of carrying the heavy loads which are frequently encountered in vehicles to which the present invention may be adapted; but it will be understood that as far as the features of the invention themselves are concerned, either a single or double tread wheel may be used as desired.

The axle housing 4 has its inner end connected to or comprising a portion of the differential housing 5. The axle shaft 6 carries the differential pinion 7 at its inner end. This is in accordance with well understood practice.

At its outer end the housing tube 4 is telescoped into a sleeve 8 which constitutes an inwardly reaching extension from the lower portion of a gear housing 9. The parts may be fastened together in any convenient manner as by the use of rivets 10.

The gear housing 9 is of the general shape shown in Fig. 2. It includes the lower pinion housing 11 and the upper gear housing 12 to accommodate the spur pinion 13 and spur gear 14 respectively.

The pinion 13 is mounted on the outer end of the axle shaft or a continuation thereof. This outer end is supported by ball bearings 15 and 16 at the opposite sides of the spur pinion, said ball bearings being suitably socketed within the lower portion of the housing 9.

The spur gear 14 is drivingly mounted on the hub shaft 17 which is in line with the axis of the driving wheel. At its inner end the hub shaft 17 is carried by a taper roller bearing 18 suitably socketed in the body of the upper portion of the housing 9. A cap 19 closes the housing opposite to this bearing.

On the other side of the spur gear 14 the shaft 17 is enlarged and is supported by another roller bearing 20 which is socketed within a cap member 21 which serves to close the opposite side of the housing 9. This cap member is of course held in place by tap screws, as illustrated in Fig. 1, or in any other convenient manner.

The hub shaft 17 is shouldered at the point 22 immediately to the outside of the inner runner of the taper roller bearing 20; and the inner runner of the taper roller bearing 18 is held in place by a nut 23 at the inner end of the hub shaft 17.

The outer end of the hub shaft 17 is flanged as shown at 24 and receives the hub portion 25 of the road wheel. This hub portion 25 is preferably pan shaped as illustrated in Fig. 1, so that its flange 26 can be carried back to a position slightly farther in than the position of the bearing 20. The road wheel is then attached to this flange. It is also preferable that the cap 25 be provided with an inwardly reaching stud 27 which is socketed in the outer end portion of the hub shaft 17 as clearly illustrated in Fig. 1 so as to improve the rigidity of the wheel support.

The particular wheel illustrated includes the circular flange members 28 and 29 which have the outwardly reaching annular flanges 30 and 31 upon which the tire rims 32 and 33 respectively are mounted. These carry the tires 34 and 35. The inner portions of the flanges 28 and 29 are secured to the flange 26 of the member 25 by suitable through bolts 36; and owing to the position of the flange 26, it will be noted that the center plane of the combined wheel passes substantially through the bearing 20. Thus this bearing carries the load directly. It is also noted that the bearing 20 is of larger size than the bearing 18, since it carries the load on the wheel as well as supporting the outer end of the hub shaft 17.

Reaching inwardly from the flange 26 is the brake drum 37. The same may be secured to the flange 26 by the same through bolts 36 as are used to hold the wheel members in position.

Two curved brake shoes 38 and 39 are illustrated, the same being of the internal expanding type and lying at opposite sides of the housing 9. The lower ends of these brake shoes are pivoted on the pins 40 and 41 which in turn are socketed on the lugs 42 and 43 which reach outwardly at the sides of the lower portion 11 of the housing 9. The upper ends of the brake shoes are actuated by the cam member 44 on the rock shaft 45 which is journaled in the lugs 46 and 47 which reach upwardly from the housing 9. This cam block 44 works against the hardened surfaces 48 and 49 on the inner faces of the upper ends of the brake shoes.

A suitable lever 50 is provided on the inner end of the rock shaft 45 for operating the brakes.

It will be observed that with this construction the entire driving gear mechanism together with the bearings for the hub shaft 17 are carried within an oil tight casing, and that the only point at which the oil can leak out of the same is around the enlarged outer end of the hub shaft 17 which can be readily packed by a felt washer at the point 51 in Fig. 1. It will also be noted that it is practically impossible for oil or grease to find its way onto the inner surface of the brake drum or shoes.

This construction makes it possible to drop the level of the floor 52 down to a point substantially on a line with the hub shaft 17. Also the axle housing and differential housing are lowered to a point which is very close to the ground level. This lowering of the floor level is made possible by placing the spur pinion at the lower side of the spur gear.

While I have herein shown and described only a single embodiment of the features of my present invention, still I do not intend to limit myself to the same, except as I may do so in the claims.

I claim:

1. Driving gear for motor vehicles comprising in combination an axle shaft housing, a spur gear housing at the outer end thereof having a relatively small arcuate lower section for the accommodation of a driving spur pinion, a neck on said lower section telescoped with respect to the end portion of the axle shaft housing, a relatively large arcuate upper section on the spur gear housing for the accommodation of the driving spur gear, an axle shaft reaching through the axle shaft housing and into the lower arcuate section aforesaid, a spur pinion on the outer end of said axle shaft, a bearing within the lower arcuate housing for the axle shaft at each side of the spur pinion, a hub shaft within the upper arcuate housing having its outer end projecting through the wall thereof, a spur gear thereon meshing with the pinion, a bearing in the upper arcuate housing for the hub shaft at each side of the spur gear, the outermost of said bearings being of relatively large size as compared to the innermost, means for sealing the arcuate housing in oil tight fashion, a pan shaped hub plate secured to the projecting portion of the hub shaft and having its peripheral portion reaching backwardly towards the arcuate housing and into substantial alignment with the larger hub shaft bearing aforesaid, and a road wheel secured to said peripheral portion, substantially as described.

2. Driving gear for motor vehicles comprising in combination an axle shaft housing, a spur gear housing at the outer end thereof having a lower section for the accommodation of a driving spur pinion, a neck on said lower section telescoped with respect to the end portion of the axle shaft housing, an upper section on the spur gear housing for the accommodation of the driving spur gear, an axle shaft reaching through the axle shaft housing and into the lower section aforesaid, a spur pinion on the outer end of said axle shaft, a bearing within the lower housing for the axle shaft at each side of the spur pinion, a hub shaft within the upper housing having its outer end projecting through the wall thereof, a spur gear thereon, meshing with the pinion, a bearing in the upper housing for the hub shaft at each side of the spur gear, the outermost of said bearings being of relatively large size as compared to the innermost, means for sealing the housing in oiltight fashion, a pan shaped hub plate secured to the projecting portion of the hub shaft and having its peripheral portion reaching backwardly towards the housing and into substantial alignment with the larger hub shaft bearing aforesaid, and a road wheel secured to said peripheral portion, substantially as described.

3. Driving gear for motor vehicles comprising in combination an axle shaft housing, a spur gear housing at the outer end thereof having a lower section for the accommodation of a driving spur pinion, an upper section on the spur gear housing for the accommodation of the driving spur gear, an axle shaft reaching through the axle shaft housing and into the lower section aforesaid, a spur pinion on the outer end of said axle shaft, a bearing within the lower housing for the axle shaft at each side of the spur pinion, a hub shaft within the upper housing having its outer end projecting through the wall thereof, a spur gear thereon meshing with the pinion, a bearing in the upper housing for the hub shaft at each side of the spur gear, the outermost of said bearings being of relatively large size as compared to the innermost, means for sealing the housing in oil tight fashion, a pan shaped hub plate secured to the projecting portion of the hub shaft and having its peripheral portion reaching backwardly towards the housing and into substantial alignment with the larger hub shaft bearing aforesaid, and a road wheel secured to said peripheral portion, substantially as described.

4. Driving gear for motor vehicles comprising in combination an axle shaft housing, a spur gear housing at the outer end thereof having a lower section for the accommodation of a driving spur pinion, an upper section on the spur gear housing for the accommodation of the driving spur gear, an axle shaft reaching through the axle shaft housing and into the lower section aforesaid, a spur pinion on the outer end of said axle shaft, a bearing within the lower housing for the axle shaft at each side of the spur pinion, a hub shaft within the upper housing having its outer end projecting through the wall thereof, a spur gear thereon meshing with the pinion, a bearing in the upper housing for the hub shaft at each side of the spur gear, means for sealing the housing in oil tight fashion, a pan shaped hub plate secured to the projecting portion of the hub shaft, and a road wheel secured to said hub plate, substantially as described.

5. Driving gear for motor vehicles comprising in combination an axle shaft housing, a spur gear housing at the outer end thereof having a lower section for the accommodation of a driving spur pinion, an upper section on the spur gear housing for the accommodation of the driving spur gear, an axle shaft reaching through the axle shaft housing and into the lower section aforesaid, a spur pinion on the outer end of said axle shaft, a bearing within the lower housing for the axle shaft at each side of the spur pinion, a hub shaft within the upper housing having its outer end projecting through the wall thereof, a spur gear thereon meshing with the pinion, a bearing in the upper housing for the hub shaft at each side of the spur gear, a pan shaped hub plate secured to the projecting portion of the hub shaft, and a road wheel secured to said hub plate, substantially as described.

6. A driving gear for motor vehicles comprising in combination an axle shaft housing, a gear housing rigidly secured to the outer end of the axle shaft housing and upwardly extending therefrom and supported thereby, an axle shaft reaching through the axle shaft housing and into the lower portion of the gear housing, a journal mounting for the axle shaft located within the lower portion of the gear housing, a driving spur gear on said outer end of the axle shaft and located within the housing, a driven spur gear within the housing and above the driving spur gear and in mesh therewith, a hub shaft having its inner end terminating within the housing and having its outer end projecting outwardly therefrom, upon which hub shaft the driven gear is fixedly mounted, journal mountings within the housing for said hub shaft, said mountings being located on opposite sides of the driven spur gear, a hub plate fixedly secured to the outwardly protruding end of the hub shaft, and a road wheel encircling the hub plate and fixedly secured thereto, substantially as described.

7. A driving gear for motor vehicles comprising in combination an axle shaft housing, a gear housing rigidly secured to the outer end of the axle shaft housing and upwardly extending therefrom and supported thereby, an axle shaft reaching through the axle shaft housing and into the lower portion of the gear housing, a journal mounting for the axle shaft located within the lower portion of the gear housing, a driving spur gear on said outer end of the axle shaft and located within the housing, a driven spur gear within the housing and above the driving spur gear and in mesh therewith, a hub shaft having its inner end terminating within the housing and having its outer end projecting outwardly therefrom, upon which hub shaft the driven gear is fixedly mounted, journal mountings within the housing for said hub shaft, said mountings being located on opposite sides of the driven spur gear, a hub plate fixedly secured to the outwardly protruding end of the hub shaft, said hub plate being of dished formation and extending inwardly around the outer face of the housing, and a road wheel encircling the dished hub plate and fixedly secured to the inwardly extending margin thereof at a point substantially in the plane of the outer mounting for the hub shaft, substantially as described.

GEORGE JOHN RACKHAM.